C. M. WILLIS.
FISH HOOK.
APPLICATION FILED JULY 8, 1908.

914,906.

Patented Mar. 9, 1909.

WITNESSES
L. Almquist
Wm. P. Patton

INVENTOR
Charles M. Willis
BY Munn & Co.
ATTORNEYS

THE NORRIS PETERS CO., WASHINGTON, D. C.

UNITED STATES PATENT OFFICE.

CHARLES MARSHALL WILLIS, OF AUSTIN, TEXAS.

FISH-HOOK.

No. 914,906.      Specification of Letters Patent.      Patented March 9, 1909.

Application filed July 8, 1908. Serial No. 442,448.

*To all whom it may concern:*

Be it known that I, CHARLES M. WILLIS, a citizen of the United States, and a resident of Austin, in the county of Travis and State of Texas, have invented a new and Improved Fish-Hook, of which the following is a full, clear, and exact description.

This invention relates to a class of fish hooks wherein duplicate hooks are provided, that are spaced apart by the pull of a fish on the line.

The purpose of the invention is to provide novel details of construction for a fish hook of the character indicated, which adapt the hook for reliable service, and positively insure the divergence of the hook members upon the application of draft strain.

The invention consists in the novel construction and combination of parts, as is hereinafter described and defined in the appended claims.

Reference is to be had to the accompanying drawings forming a part of this specification, in which similar characters of reference indicate corresponding parts in both views.

Figure 1:
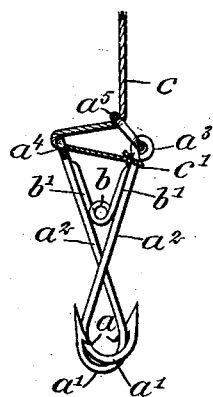
Figure 2:
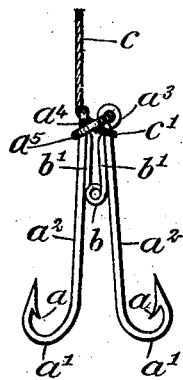

Figure 1 is a side view of the improved two-part fish-hook, showing the duplicate hook members thereof folded for the reception of a bait, and Fig. 2 is a side view of the device, showing the hook members diverged by a pull on the line upon which the hook is secured.

The improved fish-hook comprises two hook members that are duplicates, each formed of resilient wire, having a barb $a$ on one end, that is sharp pointed and a curve bent thereon adjacent to the barbed end $a$, as shown at $a'$. The shank $a^2$ of each hook member is straight and of a suitable length, each of said shanks terminating in a ring-eye, designated respectively as $a^3$, $a^4$, and, as shown, the plane of one ring-eye $a^3$ coincides with the plane of the curved portion $a'$ of the hook member whereon said ring-eye is formed. The ring-eye $a^4$, it will be noted, is disposed in a plane substantially at a right angle to the plane occupied by the curved or bowed end portion $a'$ of its hook member, and this feature is very essential, as will hereinafter appear. On the ring-eye $a^3$ a closed ring $a^5$ is loosely secured.

A coiled spring $b$ formed of resilient wire and having straight limbs $b'$ extended from opposite ends of the coil and that normally diverge at an angle, affords means for the automatic closure of the bowed or curved portions $a'$ into lapped engagement with each other. To this end, the limbs $b'$ are lapped respectively upon the opposed surfaces of the shanks $a^2$, near the ring-eyes $a^3$, $a^4$, and thereto secured. The expansive force had by the coiled spring $b$ is such that the limbs thereof may be readily pressed toward each other, and thus diverge the barbed ends $a$ of the hook members.

A snell or like flexible strand $c$ is attached by one end $c'$ to the shank $a^2$ of the hook member having the ring-eye $a^3$ thereon, the point of attachment being near said ring-eye. From the shank $a^2$ the snell $c$ is extended toward and passed through the ring-eye $a^4$, and thence is doubled, so as to return said flexible connection toward the ring $a^5$ through which it is threaded, and thence may be extended and attached by its extended end to a suitable fishing-line, not shown.

In arranging the improved device for use, the normally lapped end portions having the barbed ends $a$ thereon may have a suitable bait loosely mounted thereon, which will cover the barbed ends and lure fish to bite.

When a cast of the hook is made, the snell will be so engaged with the ring-eye $a^4$ and the ring $a^5$ that the action of the water current will tend to turn the bait around, owing to the suspension of the completed hook from one shank thereof, and thus give a life-like motion to the bait, which will attract fish. Upon the seizure of the bait and hook by a good sized fish, the bait will become detached and the two members of the hook, having pointed and barbed ends, will, by the pull of the fish, be diverged at said barbed ends, and become embedded in the mouth or throat of the fish.

The compression of the limbs $b'$ of the spring $b$, which diverges the bowed portions of the hook members $a^2$, due to a pull on the snell $c$, causes the loose ring $a^5$ to pass over the ring eye $a^4$, and drop into locked position below said ring eye, thus securing the barbed ends of the twin hooks in diverged adjustment, as shown in Fig. 2.

Having thus described my invention, I claim as new and desire to secure by Letters Patent:

1. A fish hook, comprising two hooks arranged with their barbed ends projecting in opposite directions, and a spring securing the hooks together, the spring being arranged between and secured to the shanks of the hooks and normally holding the shanks crossed and the barbed ends lapped one upon the other.

2. A fish hook, comprising duplicate hook members, each having a looped end, a barb thereon, and a straight shank, a ring-eye on one shank, disposed in the same plane with the looped end thereon, a ring loose on said ring-eye, a ring-eye on the other shank, disposed at a right angle to the plane of the looped end thereon, and a coiled spring having two divergent limbs that are secured on the shanks oppositely, and that normally close the looped ends of the hook members.

3. The combination with a fish-hook having duplicate hook members, each having a looped end, a barb and a point on said end, a straight shank, a ring-eye on one shank disposed in the same plane with that of the looped end and barb thereon, a loose ring on said ring-eye, a ring-eye on the other shank, disposed at a right angle to the looped end and barb thereon, and a coiled spring having two divergent limbs that are oppositely secured between the shanks near the ring-eyes thereon and normally lap the looped ends of the hook members together, of a snell or like flexible connection, secured by one end on one shank near the ring-eye carrying the loose ring, said snell being threaded first through the opposed ring-eye and then returned to engagement with the loose ring, whereby the loose end of the snell is disposed at one side of the fish-hook.

4. A fish hook, comprising two hooks arranged with their barbed ends projecting in opposite directions, and a coiled spring arranged between the shanks of the hooks and having terminal members rigidly secured to the opposed surfaces of the said shanks, whereby the hooks are connected and normally held with their shanks crossed.

In testimony whereof I have signed my name to this specification in the presence of two subscribing witnesses.

CHAS. MARSHALL WILLIS.

Witnesses:
   Wm. von Rosenberg, Jr.,
   Paul von Rosenberg.